(12) United States Patent
Tokuda et al.

(10) Patent No.: US 6,265,105 B1
(45) Date of Patent: Jul. 24, 2001

(54) SEALED, ALKALINE-ZINC STORAGE BATTERY

(75) Inventors: Mitsunori Tokuda, Osaka; Mutsumi Yano, Hirakata; Mitsuzou Nogami, Tokushima; Shin Fujitani; Koji Nishio, both of Hirakata, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/329,603

(22) Filed: Jun. 10, 1999

(30) Foreign Application Priority Data

Jun. 12, 1998 (JP) .................................................. 10-165336

(51) Int. Cl.⁷ ............................. H01M 6/04; H01M 6/08; H01M 4/42; H01M 4/32
(52) U.S. Cl. .......................... 429/206; 429/164; 429/229; 429/223; 429/321; 429/238
(58) Field of Search .................................... 429/206, 229, 429/223, 321, 238, 164

(56) References Cited

U.S. PATENT DOCUMENTS

| | | | |
|---|---|---|---|
| 4,327,157 | * | 4/1982 | Himy et al. ............................. 429/61 |
| 4,464,446 | * | 8/1984 | Berger et al. ......................... 429/190 |
| 5,405,719 | * | 4/1995 | Sonoda et al. ....................... 429/223 |
| 5,569,559 | * | 10/1996 | Fauvarque ............................ 429/192 |
| 6,150,052 | * | 11/2000 | Urry ..................................... 429/128 |

FOREIGN PATENT DOCUMENTS

| | | |
|---|---|---|
| 45-3570 | 2/1970 | (JP) . |
| 45-16653 | 6/1970 | (JP) . |
| 7-122276 | 5/1995 | (JP) . |
| 10-214621 | 8/1998 | (JP) . |

OTHER PUBLICATIONS

"Batteries", Karl V. Kordesch, Marcel Dekker, Inc. , NY, 1974, vol. 1, Manganese Dioxide, pp. 256 to 269.

* cited by examiner

*Primary Examiner*—Carol Chaney
*Assistant Examiner*—Angela J. Martin
(74) *Attorney, Agent, or Firm*—W. F. Fasse; W. G. Fasse (57) ABSTRACT

A sealed alkaline-zinc storage battery includes a battery can, a hollow positive electrode disposed within the battery can in electrical contact therewith and containing a positive active material including nickle hydroxide, a negative electrode disposed inwardly of the positive electrode and containing a negative active material including zinc, a separator disposed between the positive and negative electrodes, a negative current collector inserted into the negative electrode, and an alkaline electrolyte filled in the battery can and impregnated into the positive electrode, negative electrode and separator. The positive electrode, negative electrode, separator, negative current collector and electrolyte together account for at least 75% of an internal volume of the battery can. The alkaline electrolyte is in the 30 to 45 mass % concentration range and has a total water content in the range of 0.5 to 0.9 g for each theoretical capacity of the negative electrode expressed as 1 Ah (ampere-hour).

13 Claims, 1 Drawing Sheet

SEALED, ALKALINE-ZINC STORAGE BATTERY

BACKGROUND OF THE INVENTION

1. Field of the Invention

The present invention relates to a sealed alkaline-zinc storage battery capable of starting with discharge, more particularly to a sealed alkaline-zinc storage battery which exhibits excellent storage characteristics, such as a low degree of deterioration in discharge capacity even after a long-term storage and the reduced occurrence of leakage of electrolyte. The storage battery capable of starting with discharge, as used herein, refers to the storage battery which can start initially with discharging without a need to be charged prior to use.

2. Related Art

In Japanese Patent Publication No. 45-16653 (1970), an alkaline-manganese secondary battery is disclosed which includes manganese dioxide as a depolarizer, zinc as negative active material and an aqueous caustic solution as an electrolyte, and which specifies a total water content of the alkaline electrolyte as being within the range of 0.75–1.10 g relative to 1 g of zinc as the negative active material. In this secondary battery, the water content of the alkaline electrolyte is in the range of 0.92–1.34 g for each theoretical capacity of the negative electrode.

The inventors of the present application have found that the water content range of the alkaline electrolyte specified in the above-identified reference, if applied to a sealed alkaline-zinc storage battery capable of starting with discharge and including nickel hydroxide as a positive active material and zinc as a negative active material, adversely affects the long-term storage characteristics thereof. Specifically, such a storage battery exhibits appreciable deterioration in discharge capacity. With the increased number of charge-discharge cycles, the increasing amount of oxygen gas evolution occurs at the positive electrode to raise an internal pressure of the battery, ultimately causing the electrolyte to leak.

SUMMARY OF THE INVENTION

An object of the present invention is to provide a sealed alkaline-zinc storage battery which exhibits excellent storage characteristics, i.e., a low degree of deterioration in discharge capacity and reduced occurrence of electrolyte leakage even after a long-term storage.

A sealed alkaline-zinc storage battery of the present invention includes a battery can, a hollow positive electrode located within the battery can for electrical connection thereto and containing nickle hydroxide as a positive active material, a negative electrode located inwardly of the positive electrode and containing zinc as a negative active material, a separator interposed between the positive and negative electrodes, a negative current collector located for insertion into the negative electrode, and an electrolyte impregnated into the positive electrode, negative electrode and separator. The positive electrode, negative electrode, separator, negative current collector and electrolyte account for at least 75% of an internal volume of the battery can. The alkaline electrolyte is in the 30–45 mass % concentration range. A total water content of the alkaline electrolyte is in the range of 0.5–0.9 g for each theoretical capacity (expressed as 1 Ah (ampere-hour)) of the negative electrode.

For prior art sealed alkaline-zinc storage batteries, the charge-discharge cycling following a long-term storage causes deterioration in discharge capacity of a zinc negative electrode. This results from a reaction, $Zn+2OH^-\rightarrow Zn(OH)_2+2e^-$, at the negative electrode during storage. That is, water contained in the alkaline electrolyte is transferred to the zinc electrode through this reaction to cause depletion of dry-out of the alkaline electrolyte, leading to the increase in internal resistance of the battery. If a total water content of the alkaline electrolyte falls below 0.5 g for each theoretical capacity of the negative electrode, the shortage in absolute quantity of the electrolyte may result in the deterioration in discharge capacity of the battery after a long-term storage, i.e., result in the deteriorated storage characteristics. On the other hand, if a total water content of the alkaline electrolyte exceeds 0.9 g for each theoretical capacity of the negative electrode, the abundance in absolute quantity of the electrolyte may result in the increased oxygen gas evolution at the positive electrode on charge-discharge cycling of the battery after a long-term storage, which increases an internal battery pressure to finally cause leakage of the electrolyte. In the sealed alkaline-zinc storage battery of the present invention, a total water content of the alkaline electrolyte is accordingly specified as being within the range of 0.5–0.9 g for each theoretical capacity of the negative electrode.

Also in the present invention, the alkaline electrolyte is in the 30–45 mass % concentration range. If the concentration of the alkaline electrolyte is below 30 mass %, the solubility of zinc into the electrolyte will be lowered to result in the passivation of the zinc electrode which limits the battery performance. The battery, if rendered negative-limiting, fails to withdraw a full discharge capacity, resulting in the deteriorated cycle characteristics. On the other hand, if it exceeds 45 mass %, an absolute quantity of water in the electrolyte decreases to result in deteriorating storage characteristics of the battery. The preferred alkaline electrolyte consists principally of an aqueous solution of potassium hydroxide (KOH). Lithium hydroxide (LiOH) or sodium hydroxide (NaOH) may be added to the aqueous potassium hydroxide solution. In the sealed alkaline-zinc storage battery of the present invention, the positive electrode, negative electrode, separator, negative current collector and electrolyte account for at least 75% of an internal volume of the battery can. This permits the high-density loading of active materials in the battery can, so that the storage battery is allowed to have a high energy density. While an increase in internal pressure is highly expected for such sealed alkaline storage batteries having high loadings of active materials in a battery can, the battery of the present invention is able to effectively prevent the electrolyte from leaking to outside after repetitive charge-discharge cycles.

In the present invention, preferably utilized for the negative active material is zinc active material consisting principally of a mixture of metallic zinc and zinc oxide. It is further preferred that the zinc active material contains 5–40 mass % of zinc oxide, relative to the weight of metallic zinc. If the amount of zinc oxide falls below 5 mass %, relative to the weight of the metallic zinc in the zinc active material, the zinc oxide may become insufficient in amount to compensate for deterioration of zinc (discharge reserve), when subjected to a charge-discharge test after a long-term storage. This results in the deterioration in discharge capacity. On the other hand, if the amount of the zinc oxide exceeds 40 mass %, the deterioration in amount of the metallic zinc in the zinc active material necessitates the increased loading of the negative electrode, which in turn reduces a volumetric space left within the battery. This may result in the increased occurrence of electrolyte leakage.

In the present invention, the negative electrode is preferably in the form of gel containing negative active materials.

Such a gelled negative electrode can be prepared from a combination of a negative active material(s), a gelling agent such as water-soluble polymeric material, and an alkaline electrolyte.

In the present invention, the positive active material is nickel hydroxide. Prior to a first discharge, the nickel hydroxide is preferably present in the higher-valent form, γ-nickel oxyhydroxide. A valence number of nickel atoms in the γ-nickel oxyhydroxide is preferably in the range of 3.4–3.8. If the valence number is below 3.4, the battery capacity may become insufficient. For γ-nickel oxyhydroxide, the nickel valence number does not exceed 3.8. That is, once the battery is fully charged, further charging simply generates oxygen gas at positive electrode by electrolysis of water, and the nickel valence number is maintained within 3.8.

In a particular embodiment of the present invention, the negative active nickel hydroxide may preferably contain at least one element selected from the group consisting of manganese (Mn), aluminum (Al), cobalt (Co), yttrium (Y), ytterbium (Yb), erbium (Er) and gadolinium (Gd) to form a solid solution therewith. The addition of such an element, in the form of solid solution, serves to increase the oxygen overvoltage (oxygen evolution potential—charge potential) to a level sufficient to suppress the oxygen gas evolution. Among the above-listed elements, manganese is particularly preferred.

The element added in the form of a solid solution is preferably in the range of 5–50 mass %, based on the total weight of the positive active material. In other words, the solute element is incorporated preferably in the amount of 5–50 mass %, based on the total weight of the solute atoms and nickel atoms in the positive active material. If the element content becomes less than 5 mass %, the crystalline structure of nickel hydroxide ($Ni(OH)_2$), which is a reaction product on discharge, may change from the α-form to β-form after a successive number of charge-discharge cycles. This reduces the oxygen overvoltage which promotes the oxygen gas evolution at the positive electrode during charge. On the other hand, if the element content exceeds 50 mass %, nickel hydroxide is reduced in amount to possibly result in the failure to obtain a sufficient level of discharge capacity. The element content can be properly adjusted by mixing a nickel source and an element source in a controlled weight ratio.

In the present invention, the negative active zinc may preferably contain an additive to increase its hydrogen overvoltage. Such an additive may be selected from the group consisting of indium (In), bismuth (Bi), tin (Sn), gallium (Ga), indium oxide ($In_2O_3$), bismuth oxide ($Bi_2O_3$), tin oxide (SnO) and gallium oxide ($Ga_2O_3$). Incorporation of the additive in the negative active zinc effectively increases the hydrogen overvoltage of zinc to a level sufficient to suppress the hydrogen gas evolution.

The aforementioned additive may be incorporated in the amount of 0.005–0.5 mass %, relative to the weight of metallic zinc. The incorporation of the additive in the amount of below 0.005 mass % may result in the failure to increase the hydrogen overvoltage to the sufficient level. On the other hand, if the additive is incorporated in the amount of higher than 0.5 mass %, the negative active zinc is relatively reduced in amount to possibly result in the failure to obtain a sufficient level of discharge capacity.

DESCRIPTION OF THE PREFERRED EMBODIMENTS

A detailed description of the present invention is given below with reference to embodiments. It should be noted, however, that they are not intended to limit the present invention in any way and various changes and modifications can be made without departing from the scope of the present invention.

Experiment 1

Experiment 1 was conducted to investigate the relationship of a total water content of an alkaline electrolyte to storage characteristics of a sealed alkaline-zinc storage battery. The following procedures were utilized to respectively prepare a negative electrode, fabricate a positive electrode and assemble a battery for use in Experiment 1, with detailed descriptions thereof being given in separate sections, A though C.

A. Preparation of a Negative Electrode 100 g of metallic zinc, 0.1 g of metallic indium and 0.05 g of metallic bismuth were melt together and then formed by a gas atomization process with compressed-air into zinc alloy powder containing 0.1 mass % of indium and 0.05 mass % of bismuth, each based on the weight of zinc.

100 parts by weight of the aforementioned zinc alloy powder (20–200 mesh) and 10 parts by weight of zinc oxide were mixed to prepare a zinc active material as an active material of a negative electrode. Thus, the amount of zinc oxide incorporated in the zinc active material was 10 mass % relative to the weight of zinc. 65 g of the zinc active material, 1 g of polyacrylic acid (manufactured by Nihon Junyaku Co., Ltd. and marketed in trade as "polyacrylic acid-150"), as a gelling agent, and 34 g of a 40 mass % aqueous solution of potassium hydroxide (specific gravity—1.40 at 25° C.) were mixed to prepare a gel-form negative electrode.

A theoretical capacity calculation of the negative electrode is based on the metallic zinc and zinc oxide. Where the gelled negative electrode is filled in a battery in the amount of 5.72 g, the theoretical capacity of the negative electrode is 3 Ah (ampere-hour). The details of this calculation are given below.

A theoretical capacity of metallic zinc is 820 mAh/g and that of zinc oxide is 680 mAh/g. The gelled negative electrode includes the negative active material (3.72 g) containing the metallic zinc and zinc oxide in the weight ratio of 10:1. It follows that the negative electrode contains 3.37 g of metallic zinc and 0.34 g of zinc oxide.

The theoretical capacity of the negative electrode is then calculated from those use amounts; 820 mAh/g×3.37 g (metallic zinc)+680 mAh/g×0.34 g (zinc oxide)=2994 mAh. It approximates 3 Ah.

The 40 mass % aqueous solution of potassium hydroxide, as employed herein, serves as an electrolyte for the battery. Accordingly, if the gelled negative electrode is accommodated in the battery in the amount of 5.72 g, a water content and potassium hydroxide content of the negative electrode are 0.39 g and 0.26 g, respectively, for each theoretical capacity of the negative electrode.

B. Fabrication of a Positive Electrode 100 ml of a 0.1 mole/l nickel sulfate solution and 100 ml of a 5 mass % aqueous ammonia were poured concurrently into water contained in a vessel, followed by mixing for 1 hour while maintained at 35° C. Subsequently, a 20 mass % aqueous solution of sodium hydroxide was added dropwise to the liquid mixture under agitation in the vessel. The pH of the liquid mixture was monitored by a pH meter. As the pH showed a slight drop, the 20 mass % aqueous solution of sodium hydroxide was further added to maintain the liquid mixture at a pH of 11±0.3. The precipitate produced in the vessel was then separated by filtration, washed with water, and vacuum dried at ordinary temperature (at about 25° C.) to obtain nickel hydroxide.

500 ml of 10 mole/l sodium hydroxide aqueous solution and 500 ml of a 10 mass % sodium hypochlorite aqueous solution, as an oxidizing agent, were mixed with agitation and heated to 60° C. to obtain a treating solution for oxidization. 100 g of the aforementioned nickel hydroxide was introduced into 1000 ml of the treating solution for subsequent mixing with agitation for 1 hour. The precipitate was separated through filtration, washed with water, and dried at 60° C. to obtain nickel oxyhydroxide as a positive active material. The nickel oxyhydroxide, in the charged state, assumed a γ-NiOOH. It was confirmed separately that under the conditions of the present Experiment, no oxygen gas evolved from the nickel oxyhydroxide electrode, on charge, during a charge-discharge cycle test.

Subsequently, 90 g of the nickel oxyhydroxide powder obtained, 5 g of graphite powder and 5 g of a 40 mass % potassium hydroxide aqueous solution were mixed in a kneader for 30 minutes to obtain a positive active material. This active material was then compressed in molds into a hollow cylindrical form to prepare a positive electrode having an outer diameter of 13.3 mm, an inner diameter of 9.0 mm and a height of 13.7 mm. The 40 mass % potassium hydroxide aqueous solution, as employed above, served as an electrolyte for the battery. Where a battery is fabricated with 5.79 g of the positive electrode and 5.72 g (theoretical capacity of 3 Ah) of the negative electrode, a water content and potassium hydroxide content of the positive electrode are 0.058 g and 0.039 g, respectively, for each theoretical capacity of the negative electrode.

Three positive electrodes configured in the shape of hollow cylinder were connected in series to provide a hollow cylindrical positive electrode unit for use in the subsequent fabrication of a battery.

C. Fabrication of a Battery

An AA-size, sealed alkaline-zinc storage battery "A" in accordance with the present invention was fabricated using the aforementioned positive and negative electrodes. The storage battery was constructed in a so-called "inside-out" configuration, so that a battery can was on a positive side and a lid on a negative side. The inside-out battery of the present embodiment was constructed such that the gelled negative electrode was filled in a hollow portion of the hollowed cylindrical positive electrode, with a cylindrically-configured film separator in-between.

In order to render the battery capacity positive-limited, the hollow cylindrical positive electrode and the gelled negative electrode were accommodated in the battery, respectively in the amounts of 5.79 g (theoretical capacity of 1500 mAh) and 5.72 g (theoretical capacity of 3 Ah) so that a ratio in theoretical capacity of the positive to negative electrode was set at 1:2. This capacity ratio was applied to every battery as fabricated hereinafter.

The separator was previously impregnated with 1.31 g of a 40 mass % potassium hydroxide aqueous solution, as an alkaline electrolyte, and accordingly its water content was 0.26 g for each theoretical capacity of the negative electrode.

The alkaline electrolyte of the battery was thus distributed to reside in the positive electrode, negative electrode and separator. On the basis of a total amount of the alkaline electrolyte contained therein, its water content was 0.058 g (in the positive electrode)+0.39 g (in the negative electrode)+0.26 g (in the separator)=0.71 g, and its potassium hydroxide content was 0.47 g, for each theoretical capacity of the negative electrode. In calculations of the theoretical capacity and electrolyte-associated parameters, a second decimal place was selected as being significant to round numbers located in the third decimal place.

Figure 1:
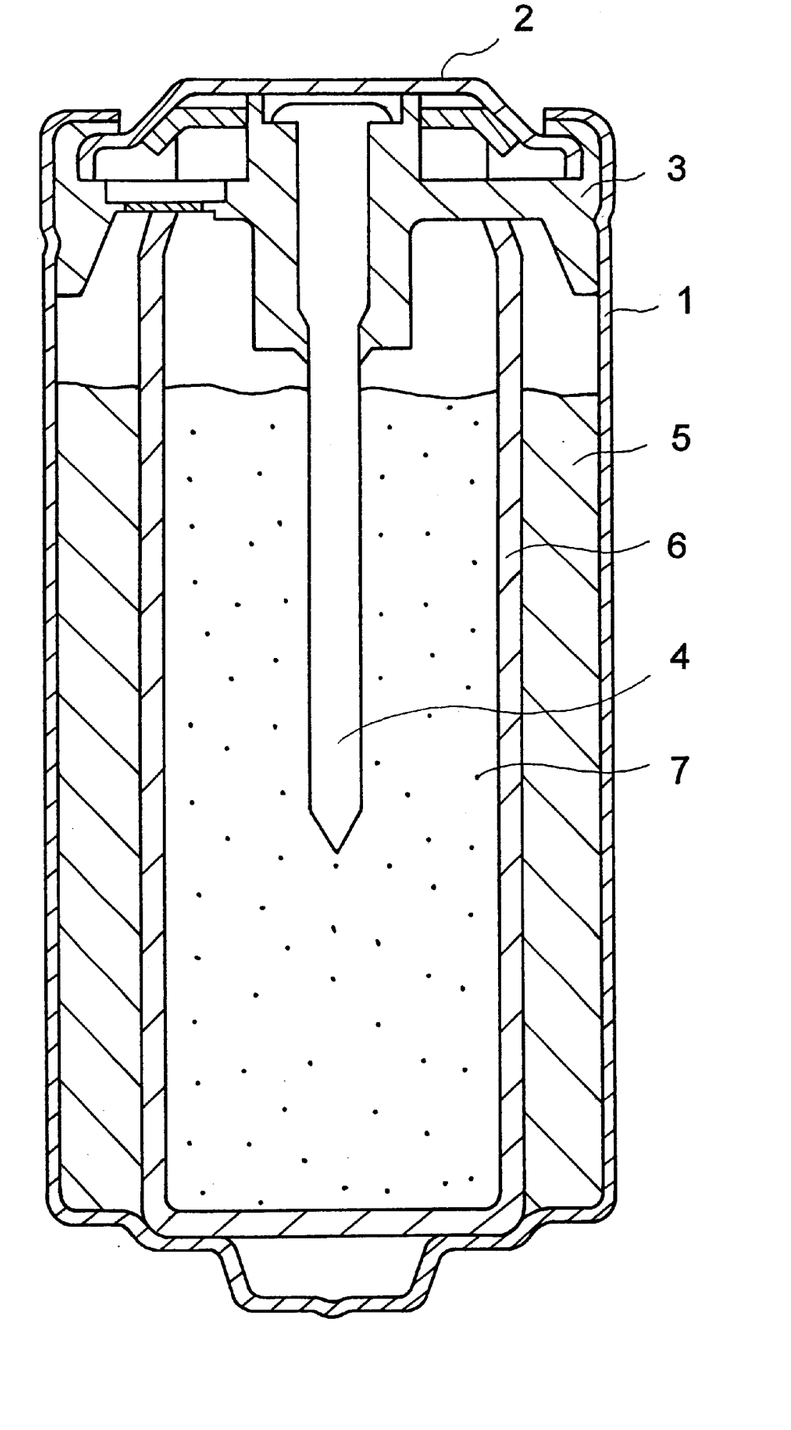
FIG. 1 is a sectional view, illustrating an embodiment of a sealed alkaline-zinc storage battery in accordance with the present invention.

FIG. 1 is a sectional view of the battery "A" of the present invention as fabricated in the manner as stated above. The illustrated battery includes a cylindrically-shaped positive can 1 (positive external terminal) having a closed bottom, a negative lid 2 (negative external terminal), an insulating gasket 3, a negative current collecting rod 4 (negative current collector) made of brass, a hollow cylindrically-shaped positive electrode 5 (nickel electrode), a sheet-form separator 6 made principally of vinylon and configured in the shape of cylinder, and a gelled negative electrode 7 (zinc electrode).

The cylindrical positive electrode 5 is housed in the positive can 1 such that its outside surface is brought into contact with an inside wall surface of the cylindrical positive can 1. The separator 6 is located such that its outside surface contacts with an inside surface of the positive electrode 5. The gelled negative electrode 7 is packed to locate inwardly of the separator 6. The negative current collecting rod 4 is inserted centrally of the negative electrode 7 and has an upper end supported by the insulating gasket 3 which serves to prevent electrical contact between the positive can 1 and negative lid 2. An upper open end of the positive can 1 is designed to be closed by the negative lid 2. Specifically, the insulating gasket 3 is configured to fit inside an upper end portion of the positive can 1, along the upper open end thereof, and the negative lid 2 is configured to peripherally engage with the insulating gasket 3. Thus, the battery can be sealed by engagingly placing the negative lid 2 on the insulating gasket 3 fitted in the positive can 1.

In the above-described battery construction, the electrolyte is impregnated into the positive electrode 5, separator 6 and negative electrode 7. In this particular embodiment, the positive electrode 5, negative electrode 7, separator 6, negative current collecting rod 4 (current collector) and electrolyte account for 80% of a battery's internal volume defined by the positive can 1, negative lid 2 and insulating gasket 3.

The positive electrode of the battery shown in FIG. 1 is constructed in a cylindrical shape. However, the shape of the positive electrode is not limited thereto and may be prismatic, so long as it is hollowed. The positive electrode may be suitably varied in shape depending on the particular configuration of the battery used.

The procedure for fabrication of the battery "A" was repeated, except that the amount of the alkaline electrolyte in the separator, as specified in the section of "Fabrication of a battery" as being 1.31 g, was changed to 0.26 g, 0.76 g, 1.76 g and 2.26 g, to fabricate batteries "B" through "E" in accordance with the present invention.

A total water content of the alkaline electrolyte was calculated for each of the batteries "B" through "E" to give 0.50 g, 0.60 g, 0.80 g and 0.90 g, respectively, for each theoretical capacity of the negative electrode.

For comparative purposes, the procedure for fabrication of the battery "A" was repeated, except that the amount of the alkaline electrolyte in the separator, as specified in the section of "Fabrication of a battery" as being 1.31 g, was changed to 0 g, 0.066 g, 2.36 g, 2.51 g and 2.76 g, to fabricate comparative batteries "X1" through "X5". A total water content of the alkaline electrolyte was calculated for each of the comparative batteries "X1" through "X5" to give 0.50 g, 0.60 g, 0.80 g and 0.90 g, respectively, for each theoretical capacity of the negative electrode.

It will be noticed that the total water contents calculated for the comparative batteries "X3" through "X5" fall within the range specified in the above-referenced Japanese Patent Publication No. 45–16653 (1970).

D. Proportion of Sample Batteries Showed Leakage of the Electrolyte after Charge-Discharge Cycles The batteries "A" through "E" of the present invention, as well as the comparative batteries "X1" through "X5", were subjected to charge-discharge cycle test to observe the possible occurrence of electrolyte leakage.

10 samples were prepared for each designated battery. Each sample battery, connected to the 3.9 Ω resistence, was initially discharged at room temperature up to 0.9 V and then recharged at a current of 150 mA up to 1.95 V. Following this cycle of discharging and charging, the sample batteries were stored at 60° C. for 20 days. After the 20-day storage period, each sample battery was subjected to a charge-discharge cycle test under the above-specified cycling condition. The sample batteries were measured for 1st-cycle and 10th-cycle discharge capacity. Also, the number of sample batteries which showed leakage of the electrolyte was counted after 1 cycle, 5 cycles and 10 cycles.

The results are shown in table 1. In table 1, either of the 1st-cycle discharge capacity and 10th-cycle discharge capacity is indicated by a mean value obtained by averaging the discharge capacity values measured for the sample batteries which showed no leakage of electrolyte, and by an index number as the discharge capacity value measured before the high-temperature storage is taken as a standard value of 100. Also in Table 1, a proportion of sample batteries which showed leakage of the electrolyte was indicated for each designated battery. The number of sample batteries subjected to the cycle test is given in a denominator, while the number of sample batteries showed leakage of the electrolyte is given in a numerator.

TABLE 1

| Designation of Battery | Water Content(*1) (g) | 1st-cycle Disc. Cap. | 10th-cycle Disc. Cap. | Number of cycles | Degree of Leakage (*2) |
|---|---|---|---|---|---|
| A | 0.71 | 100 | 100 | 1 | 0/10 |
|   |      |     |     | 5 | 0/10 |
|   |      |     |     | 10 | 0/10 |
| X1 | 0.45 | 92 | 80 | 1 | 0/10 |
|   |      |     |    | 5 | 0/10 |
|   |      |     |    | 10 | 0/10 |
| X2 | 0.47 | 93 | 86 | 1 | 0/10 |
|   |      |     |    | 5 | 0/10 |
|   |      |     |    | 10 | 0/10 |
| B | 0.50 | 100 | 99 | 1 | 0/10 |
|   |      |     |    | 5 | 0/10 |
|   |      |     |    | 10 | 0/10 |
| C | 0.60 | 100 | 100 | 1 | 0/10 |
|   |      |     |     | 5 | 0/10 |
|   |      |     |     | 10 | 0/10 |
| D | 0.80 | 100 | 100 | 1 | 0/10 |
|   |      |     |     | 5 | 0/10 |
|   |      |     |     | 10 | 0/10 |
| E | 0.90 | 100 | 100 | 1 | 0/10 |
|   |      |     |     | 5 | 0/10 |
|   |      |     |     | 10 | 1/10 |
| X3 | 0.92 | 99 | 92 | 1 | 0/10 |
|   |      |     |    | 5 | 2/10 |
|   |      |     |    | 10 | 5/10 |
| X4 | 0.95 | 99 | — | 1 | 1/10 |
|   |      |    |   | 5 | 6/10 |
|   |      |    |   | 10 | 10/10 |
| X5 | 1.00 | 99 | — | 1 | 1/10 |
|   |      |    |   | 5 | 8/10 |
|   |      |    |   | 10 | 10/10 |

(*1)For each theoretical capacity of a negative electrode.
(*2)A proportion of sample batteries showed leakage of the electrolyte.

As can be appreciated from Table 1, the batteries "A" through "E", which contain the alkaline electrolyte having a total water content in the range from 0.50 g to 0.90 g for each theoretical capacity of the negative electrode, maintain high levels of cycle discharge capacity even after the high-temperature storage. Also, leakage of the electrolyte is maintained at a low degree of occurrence.

These results demonstrate excellent storage characteristics of the battery in accordance with the present invention.

In contrast, the comparative batteries "X1" and "X2", while showed no leakage of the alkaline electrolyte because of its shortage in absolute quantity, exhibits the reduced 10th-cycle discharge capacity. Also, leakage of the electrolyte was observed at a higher degree of occurrence for the comparative batteries "X3" though "X5". This is considered due to the abundance in absolute quantity of the alkaline electrolyte which resulted in the increased amount of oxygen gas evolution during charge, and accordingly in the increased internal pressure of the battery.

The above results demonstrate that excellent battery performance is obtained if a total water content of the alkaline electrolyte is in the range of 0.50 g–0.90 g for each theoretical capacity of the negative electrode.

Experiment 2

Experiment 2 was conducted to investigate relationship of a concentration of the alkaline electrolyte to cycle characteristics for sealed alkaline-zinc storage batteries.

The procedure for fabrication of the battery "A" was repeated, except that the concentration of the potassium hydroxide aqueous solution, as an alkaline electrolyte, was altered, to 25 mass %, 30 mass %, 35 mass %, 45 mass % and 47 mass %, to fabricate batteries "F1" through "F5".

Analogous to the above-described Experiment #1, those batteries were measured for 1st-cycle and 10th-cycle discharge capacity after the high-temperature storage. The number of sample batteries showed leakage of electrolyte was also counted after the 1st cycle, 5th cycle and 10th cycle for each of those batteries. The results are given in Table 2.

TABLE 2

| Designation of Battery | Conc. of KOH Solution (mass %) | 1st-cycle Disc. Cap. | 10th-cycle Disc. Cap. | Number of cycles | Degree of Leakage (*1) |
|---|---|---|---|---|---|
| A | 40 | 100 | 100 | 1 | 0/10 |
|   |    |     |     | 5 | 0/10 |
|   |    |     |     | 10 | 0/10 |
| F1 | 25 | 78 | 75 | 1 | 0/10 |
|   |    |    |    | 5 | 0/10 |
|   |    |    |    | 10 | 0/10 |
| F2 | 30 | 99 | 98 | 1 | 0/10 |
|   |    |    |    | 5 | 0/10 |
|   |    |    |    | 10 | 0/10 |

TABLE 2-continued

| Designation of Battery | Conc. of KOH Solution (mass %) | 1st-cycle Disc. Cap. | 10th-cycle Disc. Cap. | Number of cycles | Degree of Leakage (*1) |
|---|---|---|---|---|---|
| F3 | 35 | 100 | 100 | 1 | 0/10 |
|  |  |  |  | 5 | 0/10 |
|  |  |  |  | 10 | 0/10 |
| F4 | 45 | 100 | 99 | 1 | 0/10 |
|  |  |  |  | 5 | 0/10 |
|  |  |  |  | 10 | 0/10 |
| F5 | 47 | 76 | 75 | 1 | 0/10 |
|  |  |  |  | 5 | 0/10 |
|  |  |  |  | 10 | 0/10 |

(*1)A proportion of sample batteries showed leakage of the electrolyte.

As can be appreciated from Table 2, the batteries "A" and "F2" through "F4" containing the potassium hydroxide, as an alkaline electrolyte, in the concentrations from 30 mass % to 45 mass %, exhibit excellent cycle characteristics.

Experiment 3

In Experiment 3, investigation was made regarding the ratio in weight of zinc oxide to metallic zinc, each contained in the zinc negative active material, for sealed alkaline-zinc storage batteries.

The procedure for fabrication of the battery "A" was repeated, except that the composition of the zinc active material was changed to those indicated in Table 3, to fabricate batteries "G1" through "G7". In the fabrication, a water content of the alkaline electrolyte was adjusted to 0.71 g for each theoretical capacity of the negative electrode.

The following Table 3 shows the amount of zinc oxide loaded in the negative electrode of each battery, based on 100 parts by weight of zinc alloy powder, as well as the amount of a gelled negative electrode varied in a controlled fashion to provide the negative electrode with a theoretical capacity of 3 Ah.

TABLE 3

| Designation of Battery | Amount of Zinc Oxide (mass %) | Loading of Gelled Negative Electrode (g) |
|---|---|---|
| A | 10 | 5.72 |
| G1 | 3 | 5.66 |
| G2 | 5 | 5.68 |
| G3 | 20 | 5.83 |
| G4 | 30 | 5.93 |
| G5 | 40 | 6.04 |
| G6 | 45 | 6.10 |
| G7 | 50 | 6.15 |

Analogous to the above-described Experiment #1, those batteries "G1" through "G7" were measured for 1st-cycle and 10th-cycle discharge capacity after the high-temperature storage. The number of sample batteries showed leakage of electrolyte was also counted after the 1st cycle, 5th cycle and 10th cycle for each of those batteries.

The results are given in Table 4. In Table 4, the 10th-cycle discharge capacity, after the high-temperature storage, is given by index numbers when the discharge capacity of each battery prior to being subjected to high-temperature storage is taken as a standard value of 100.

TABLE 4

| Designation of Battery | Amount of Zinc Oxide (mass %) | 1st-cycle Disc. Cap. | 10th-cycle Disc. Cap. | Number of cycles | Degree of Leakage (*1) |
|---|---|---|---|---|---|
| A | 10 | 100 | 100 | 1 | 0/10 |
|  |  |  |  | 5 | 0/10 |
|  |  |  |  | 10 | 0/10 |
| G1 | 3 | 99 | 78 | 1 | 0/10 |
|  |  |  |  | 5 | 0/10 |
|  |  |  |  | 10 | 0/10 |
| G2 | 5 | 100 | 99 | 1 | 0/10 |
|  |  |  |  | 5 | 0/10 |
|  |  |  |  | 10 | 0/10 |
| G3 | 20 | 100 | 100 | 1 | 0/10 |
|  |  |  |  | 5 | 0/10 |
|  |  |  |  | 10 | 0/10 |
| G4 | 30 | 100 | 100 | 1 | 0/10 |
|  |  |  |  | 5 | 0/10 |
|  |  |  |  | 10 | 0/10 |
| G5 | 40 | 100 | 100 | 1 | 0/10 |
|  |  |  |  | 5 | 0/10 |
|  |  |  |  | 10 | 1/10 |
| G6 | 45 | 100 | 99 | 1 | 3/10 |
|  |  |  |  | 5 | 6/10 |
|  |  |  |  | 10 | 9/10 |
| G7 | 50 | 99 | — | 1 | 6/10 |
|  |  |  |  | 5 | 10/10 |
|  |  |  |  | 10 | 10/10 |

(*1)A proportion of sample batteries showed leakage of the electrolyte.

The results shown in Table 4 demonstrate that the batteries "A" and "G2" through "G5", wherein zinc oxide is incorporated in the negative active material in the amount ranging from 5 to 40 parts by weight relative to the weight of metallic zinc in the zinc active material, can maintain high levels of discharge capacity even after the high-temperature storage. Also, these batteries "A" and "G2" through "G5" show the excellent storage characteristics, as can be recognized from the deterioration in number of sample batteries which resulted in the leakage of electrolyte after repetitive charge-discharge cycling.

Due to the reduced amount of zinc oxide incorporated in the negative active material, the battery "G1" shows neither appreciable deterioration in 1st-cycle discharge capacity nor electrolyte leakage during the 1st cycle. However, the 10th-cycle discharge capacity of the battery "G1" is lowered. A higher proportion of the sample batteries resulted in the leakage of electrolyte for the batteries "G6" and "G7". This is considered due to the excessively reduced volumetric space of the battery that resulted from the increased loading of the gelled negative electrode.

The above results demonstrate that excellent battery performance can be obtained if zinc oxide is incorporated in the negative active material in the amount ranging from 5 to 40 parts by weight relative to the weight of metallic zinc in the negative active material.

Experiment 4

This Experiment was conducted to investigate the relationship of addition of an element, in the form of a solid solution, to nickel oxyhydroxide positive active material, to the storage characteristics of the sealed alkaline-zinc storage battery.

Experiment 4-1

The procedure for fabrication of the battery "A" was repeated, except that 100 ml of a 0.027 mole/l manganese sulfate aqueous solution in water, together with the nickel sulfate aqueous solution, was poured into the water vessel in the fabrication of the positive electrode, to fabricate a battery "H1". The quantitative analysis according to ICP (inductively coupled plasma) emission spectroscopy revealed the manganese content of 20 mass %, as reduced to element, based on the total weight of manganese and nickel contained in both nickel hydroxide and nickel oxyhydroxide obtained by oxidizing treatment.

Experiment 4-2

The procedure for fabrication of the battery "A" was repeated, except that 100 ml of a 0.054 mole/l aluminum sulfate solution in water, together with the nickel sulfate aqueous solution, was poured into the water vessel in the fabrication of the positive electrode, to fabricate a battery "H2". The quantitative analysis according to ICP (inductively coupled plasma) emission spectroscopy revealed the aluminum content of 20 mass %, as reduced to element, based on the total weight of aluminum and nickel contained in both nickel hydroxide and nickel oxyhydroxide obtained by oxidizing treatment.

Experiment 4-3

The procedure for fabrication of the battery "A" was repeated, except that 100 ml of a 0.025 mole/l cobalt sulfate solution in water, together with the nickel sulfate aqueous solution, was poured into the water vessel in the fabrication of the positive electrode, to fabricate a battery "H3". The quantitative analysis according to ICP (inductively coupled plasma) emission spectroscopy revealed the manganese content of 20 mass %, as reduced to element, based on the total weight of cobalt and nickel contained in both nickel hydroxide and nickel oxyhydroxide obtained by oxidizing treatment.

Experiment 4-4

The procedure for fabrication of the battery "A" was repeated, except that 100 ml of a 0.017 mole/l yttrium sulfate solution in water, together with the nickel sulfate aqueous solution, was poured into the water vessel in the fabrication of the positive electrode, to fabricate a battery "H4". The quantitative analysis according to ICP (inductively coupled plasma) emission spectroscopy revealed the yttrium content of 20 mass %, as reduced to element, based on the total weight of yttrium and nickel contained in both nickel hydroxide and nickel oxyhydroxide obtained by oxidizing treatment.

Experiment 4-5

The procedure for fabrication of the battery "A" was repeated, except that 100 ml of a 0.008 mole/l ytterbium sulfate solution in water, together with the nickel sulfate aqueous solution, was poured into the water vessel in the fabrication of the positive electrode, to fabricate a battery "H5". The quantitative analysis according to ICP (inductively coupled plasma) emission spectroscopy revealed the ytterbium content of 20 mass %, as reduced to element, based on the total weight of ytterbium and nickel contained in both nickel hydroxide and nickel oxyhydroxide obtained by oxidizing treatment.

Experiment 4-6

The procedure for fabrication of the battery "A" was repeated, except that 100 ml of a 0.009 mole/l erbium nitrate aqueous solution in water, together with the nickel sulfate aqueous solution, was poured into the water vessel in the fabrication of the positive electrode, to fabricate a battery "H6". The quantitative analysis according to ICP (inductively coupled plasma) emission spectroscopy revealed the erbium content of 20 mass %, as reduced to element, based on the total weight of erbium and nickel contained in both nickel hydroxide and nickel oxyhydroxide obtained by oxidizing treatment.

Experiment 4-7

The procedure for fabrication of the battery "A" was repeated, except that 100 ml of a 0.009 mole/i gadolinium sulfate solution in water, together with the nickel sulfate aqueous solution, was poured into the water vessel in the fabrication of the positive electrode, to fabricate a battery "H7". The quantitative analysis according to ICP (inductively coupled plasma) emission spectroscopy revealed the gadolinium content of 20 mass %, as reduced to element, based on the total weight of gadolinium and nickel contained in both nickel hydroxide and nickel oxyhydroxide obtained by oxidizing treatment.

Experiment 4-8

The procedure for fabrication of the battery "A" was repeated, except that 100 ml of a 0.011 mole/l manganese sulfate solution in water and 100 ml of a 0.024 mole/l aluminum sulfate solution in water, together with the nickel sulfate aqueous solution, were poured into the water vessel in the fabrication of the positive electrode, to fabricate a battery "H8". The quantitative analysis according to ICP (inductively coupled plasma) emission spectroscopy revealed the manganese and aluminum contents as being 10 mass %, respectively, when reduced to element, based on the total weight of manganese, aluminum and nickel contained in both nickel hydroxide and nickel oxyhydroxide obtained by oxidizing treatment.

Experiment 4-9

The procedure for fabrication of the battery "A" was repeated, except that 100 ml of a 0.011 mole/l manganese sulfate solution in water, 100 ml of a 0.011 mole/l aluminum sulfate solution in water and 100 ml of a 0.003 mole/l erbium nitrate solution in water, together with the nickel sulfate aqueous solution, were poured into the water vessel in the fabrication of the positive electrode, to fabricate a battery "H9". The quantitative analysis according to ICP (inductively coupled plasma) emission spectroscopy revealed the manganese content as being 10 mass % and the aluminum and erbium contents as being 5 mass %, respectively, when reduced to element, based on the total weight of manganese, aluminum, erbium and nickel contained in both nickel hydroxide and nickel oxyhydroxide obtained by oxidizing treatment.

Analogous to the above-described Experiment #1, those 9 types of batteries, "H1" through "H9", having different metallic compositions were measured for 1st-cycle and 10th-cycle discharge capacity after the high-temperature storage. The number of sample batteries showed leakage of electrolyte was also counted after the 1st cycle, 5th cycle and 10th cycle for each of those batteries. The results are given in the following Table 5.

TABLE 5

| Designation of Battery | Alloying Element | 1st-cycle Disc. Cap. | 10th-cycle Disc. Cap. | Number of cycles | Degree of Leakage (*1) |
|---|---|---|---|---|---|
| A | None | 100 | 100 | 1 | 0/10 |
| | | | | 5 | 0/10 |
| | | | | 10 | 0/10 |
| H1 | Mn | 100 | 100 | 1 | 0/10 |
| | | | | 5 | 0/10 |
| | | | | 10 | 0/10 |
| H2 | Al | 100 | 99 | 1 | 0/10 |
| | | | | 5 | 0/10 |
| | | | | 10 | 0/10 |
| H3 | Co | 100 | 100 | 1 | 0/10 |
| | | | | 5 | 0/10 |
| | | | | 10 | 0/10 |
| H4 | Y | 100 | 100 | 1 | 0/10 |
| | | | | 5 | 0/10 |
| | | | | 10 | 0/10 |

TABLE 5-continued

| Designation of Battery | Alloying Element | 1st-cycle Disc. Cap. | 10th-cycle Disc. Cap. | Number of cycles | Degree of Leakage (*1) |
|---|---|---|---|---|---|
| H5 | Yb | 100 | 98 | 1 | 0/10 |
|    |    |     |    | 5 | 0/10 |
|    |    |     |    | 10 | 0/10 |
| H6 | Er | 100 | 100 | 1 | 0/10 |
|    |    |     |     | 5 | 0/10 |
|    |    |     |     | 10 | 0/10 |
| H7 | Gb | 100 | 99 | 1 | 0/10 |
|    |    |     |    | 5 | 0/10 |
|    |    |     |    | 10 | 0/10 |
| H8 | Mn + Al | 100 | 100 | 1 | 0/10 |
|    |         |     |     | 5 | 0/10 |
|    |         |     |     | 10 | 0/10 |
| H9 | Mn + Al + Er | 100 | 100 | 1 | 0/10 |
|    |              |     |     | 5 | 0/10 |
|    |              |     |     | 10 | 0/10 |

(*1)A proportion of sample batteries showed leakage of the electrolyte.

As can be appreciated from the results shown in Table 5 for the batteries "A" and "H1" through "H7", the addition of any one of the above-specified elements, in the form of a solid solution, to nickel hydroxide results in the provision of batteries which can maintain high levels of discharge capacity even after the high-temperature storage, and exhibit excellent storage characteristics. As can also be appreciated from the results for the batteries "H8" and "H9", the similar effects can be obtained with the addition of two or more of the above-specified elements.

Experiment 5

This Experiment was conducted to investigate the relationships between the amount of metallic element added to nickel hydroxide to form a solid solution therewith and storage characteristics of the resulting battery.

In Experiment 5, a positive active material was prepared by repeating the procedure of Experiment 1, except that the concentration of the aqueous manganese sulfate, added together with the nickel sulfate aqueous solution, was altered to those indicated in Table 6 to provide varied manganese contents. A manganese sulfate concentration employed in Experiment 4 to prepare the positive active material for the battery "H1", as well as its manganese content, are also listed in Table 6.

TABLE 6

| Designation of Battery | Conc. of Manganese Sulfate Solution (mol/l) | Manganese Content (mass %) |
|---|---|---|
| I 1 | 0.003 | 3 |
| I 2 | 0.006 | 5 |
| I 3 | 0.012 | 10 |
| H 1 | 0.027 | 20 |
| I 4 | 0.046 | 30 |
| I 5 | 0.071 | 40 |
| I 6 | 0.11 | 50 |
| I 7 | 0.13 | 55 |

These positive active materials were utilized in the same manner as in Experiment 1 to fabricate batteries "I1" through "I7".

In the same manner as in Experiment #1, the batteries "H1" and "I1" through "I7 were subjected, after the high-temperature storage, to charge-discharge cycle test for measurement of 1st-cycle and 10th-cycle discharge capacity. The number of sample batteries showed leakage of electrolyte was also counted after the 1st cycle, 5th cycle and 10th cycle for each of those batteries.

The results are given in Table 7. In Table 7, either of the 1st-cycle discharge capacity and 10th-cycle discharge capacity is indicated by a mean value obtained by averaging the discharge capacity values measured for the sample batteries which showed no leakage of electrolyte, and by an index number when the discharge capacity value measured before the high-temperature storage is taken as a standard value of 100. In the 1st-cycle discharge capacity column of Table 7, its value for each battery is also given by an index number, in parentheses, when the discharge capacity of the battery "H1" is taken as a standard value of 100.

Also in Table 7, a proportion in number of sample batteries which showed leakage of the electrolyte, after the 1st, 5th or 10th cycle, was indicated for each battery. The number of sample batteries subjected to the charge-discharge cycle test is given in a denominator, while the number of sample batteries showed leakage of the electrolyte is given in a numerator.

TABLE 7

| Designation of Battery | Manganese Content (mass %) | 1st-cycle Disc. Cap. | 10th-cycle Disc. Cap. | Number of cycles | Degree of Leakage (*1) |
|---|---|---|---|---|---|
| I 1 | 3 | 99 (103) | 98 | 1 | 0/10 |
|     |   |          |    | 5 | 0/10 |
|     |   |          |    | 10 | 3/10 |
| I 2 | 5 | 99 (101) | 99 | 1 | 0/10 |
|     |   |          |    | 5 | 0/10 |
|     |   |          |    | 10 | 0/10 |
| I 3 | 10 | 100 (101) | 99 | 1 | 0/10 |
|     |    |           |    | 5 | 0/10 |
|     |    |           |    | 10 | 0/10 |
| H 1 | 20 | 100 (100) | 100 | 1 | 0/10 |
|     |    |           |     | 5 | 0/10 |
|     |    |           |     | 10 | 0/10 |
| I 4 | 30 | 100 (99) | 100 | 1 | 0/10 |
|     |    |          |     | 5 | 0/10 |
|     |    |          |     | 10 | 0/10 |
| I 5 | 40 | 100 (98) | 99 | 1 | 0/10 |
|     |    |          |    | 5 | 0/10 |
|     |    |          |    | 10 | 0/10 |
| I 6 | 50 | 100 (97) | 99 | 1 | 0/10 |
|     |    |          |    | 5 | 0/10 |
|     |    |          |    | 10 | 0/10 |
| I 7 | 55 | 100 (91) | 99 | 1 | 0/10 |
|     |    |          |    | 5 | 0/10 |
|     |    |          |    | 10 | 0/10 |

(*1)A proportion of sample batteries showed leakage of the electrolyte.

As can be appreciated from the results shown in Table 7, the batteries "H1" and "I2" through "I6", containing the positive active material having the manganese content in the range of 5–50 mass %, not only exhibit high levels of initial discharge capacity, but also show no leakage of electrolyte after the high-temperature storage.

For the battery "I1", a higher proportion of the sample batteries showed leakage of the electrolyte after the 10th cycle. This is due to the increased internal battery pressure which resulted from the increased amount of oxygen gas evolution at the positive electrode. Conceivably, its reduced manganese content resulted in the failure to raise the oxygen overvoltage to a level sufficient to suppress the evolution of oxygen gas at the positive electrode. The battery "I7" exhibits a relatively lower level of initial discharge capacity. This is considered because of the increased manganese content which resulted in the deterioration in amount of nickel oxyhydroxide as an active material.

Experiment 6

This Experiment was conducted to investigate the relationships between the valence number of nickel in the nickel oxyhydroxide in its charged condition and the storage characteristics of the sealed alkaline-zinc storage battery.

In the positive electrode fabrication of Experiment #1, a volume of the 10 mass % sodium hypochlorite solution in water, for addition in the oxidizing process, was altered from 500 ml to 400 ml, 450 ml and 650 ml to prepare positive active materials. A valence number of nickel in the nickel oxyhydroxide was then determined utilizing a redox titration method. The nickel valence numbers were 3.3, 3.4 and 3.8, respectively.

These positive active materials were utilized in the same manner as in Experiment #1 to fabricate batteries "J1" through "J3".

In the same manner as in Experiment #1, the batteries "J1" through "J3", as well as the battery "A" fabricated in Experiment #1, were subjected, after the high-temperature storage, to charge-discharge cycle test for measurement of 1st-cycle and 10th-cycle discharge capacity. The number of sample batteries showed leakage of electrolyte was also counted after the 1st cycle, 5th cycle and 10th cycle for each of those batteries.

The results are given in Table 8. In Table 8, either of the 1st-cycle discharge capacity and 10th-cycle discharge capacity is indicated by a mean value obtained by averaging the discharge capacity values measured for the sample batteries which showed no leakage of electrolyte, and by an index number as the discharge capacity value measured before the high-temperature storage is taken as a standard value of 100.

Also, a proportion of the sample batteries showed leakage after the 1st, 5th or 10th cycle is indicated in Table 8 for each designated battery. The number of sample batteries subjected to the charge-discharge cycle test is given in a denominator, while the number of sample batteries showed leakage of the electrolyte is given in a numerator.

TABLE 8

| Designation of Battery | Valence Number of Nickel | 1st-cycle Disc. Cap. | 10th-cycle Disc. Cap. | Number of cycles | Degree of Leakage (*1) |
|---|---|---|---|---|---|
| J1 | 3.3 | 80 | 76 | 1 | 0/10 |
|  |  |  |  | 5 | 0/10 |
|  |  |  |  | 10 | 0/10 |
| J2 | 3.4 | 99 | 98 | 1 | 0/10 |
|  |  |  |  | 5 | 0/10 |
|  |  |  |  | 10 | 0/10 |
| A | 3.5 | 100 | 100 | 1 | 0/10 |
|  |  |  |  | 5 | 0/10 |
|  |  |  |  | 10 | 0/10 |
| J3 | 3.8 | 100 | 100 | 1 | 0/10 |
|  |  |  |  | 5 | 0/10 |
|  |  |  |  | 10 | 0/10 |

(*1)A proportion of sample batteries showed leakage of the electrolyte.

As can be appreciated from the results shown in Table 8, the batteries "A", "J2" and "J3" whose positive active materials, in the charged condition, contain nickel having a valence number in the range of 3.4–3.8, not only exhibit a low degree of deterioration in discharge capacity even after repetitive charge-discharge cycling, but also show no leakage of the electrolyte.

In contrast, the battery "J1" failed to provide a sufficient level of discharge capacity. This is considered due to the production of β-nickel oxyhydroxide which shows a low level of oxygen overvoltage leading to the decrease in charge acceptance of the battery.

Experiment 7

This Experiment was conducted to investigate the relationships of the type and amount of additive species loaded in the negative electrode to storage characteristics of the sealed alkaline-zinc storage battery.

Experiment 7-1

The procedure of Experiment #1 was followed, except that the zinc alloy powder, for use in the fabrication of a negative electrode, was prepared from a mixture of 99.9 g of metallic zinc and 0.1 g of metallic indium, to fabricate a battery "K1". The indium content of the zinc alloy powder was 0.1 mass %, as reduced to element, based on the total weight of zinc and indium.

Experiment 7-2

The procedure of Experiment #1 was followed, except that the zinc alloy powder, for use in the fabrication of a negative electrode, was prepared from a mixture of 99.9 g of metallic zinc and 0.1 g of metallic bismuth, to fabricate a battery "K2". The bismuth content of the zinc alloy powder was 0.1 mass %, as reduced to element, based on the total weight of zinc and bismuth.

Experiment 7-3

The procedure of Experiment #1 was followed, except that the zinc alloy powder, for use in the fabrication of a negative electrode, was prepared from a mixture of 99.9 g of metallic zinc and 0.1 g of metallic tin, to fabricate a battery "K3". The tin content of the zinc alloy powder was 0.1 mass %, as reduced to element, based on the total weight of zinc and tin.

Experiment 7-4

The procedure of Experiment #1 was followed, except that the zinc alloy powder, for use in the fabrication of a negative electrode, was prepared from a mixture of 99.9 g of metallic zinc and 0.1 g of metallic gallium, to fabricate a battery "K4". The gallium content of the zinc alloy powder was 0.1 mass %, as reduced to element, based on the total weight of zinc and gallium.

Experiment 7-5

The procedure of Experiment #1 was followed, except that the zinc alloy powder, for use in the fabrication of a negative electrode, was prepared from a mixture of 99.9 g of metallic zinc and 0.12 g of indium oxide, to fabricate a battery "K5". The indium content of the zinc alloy powder was 0.1 mass %, as reduced to element, based on the total weight of zinc and indium.

Experiment 7-6

The procedure of Experiment #1 was followed, except that the zinc alloy powder, for use in the fabrication of a negative electrode, was prepared from a mixture of 99.9 g of metallic zinc and 0.11 g of bismuth oxide, to fabricate a battery "K6". The bismuth content of the zinc alloy powder was 0.1 mass %, as reduced to element, based on the total weight of zinc and bismuth.

Experiment 7-7

The procedure of Experiment #1 was followed, except that the zinc alloy powder, for use in the fabrication of a negative electrode, was prepared from a mixture of 99.9 g of metallic zinc and 0.11 g of tin oxide, to fabricate a battery "K7". The tin content of the zinc alloy powder was 0.1 mass %, as reduced to element, based on the total weight of zinc and tin.

Experiment 7-8

The procedure of Experiment #1 was followed, except that the zinc alloy powder, for use in the fabrication of a negative electrode, was prepared from a mixture of 99.9 g of metallic zinc and 0.13 g of gallium oxide, to fabricate a battery "K8". The gallium content of the zinc alloy powder, when reduced to element, was 0.1 mass %, based on the total weight of zinc and gallium.

Experiment 7-9

The procedure of Experiment #1 was followed, except that the zinc alloy powder, for use in the fabrication of a negative electrode, was prepared from a mixture of 99.85 g of metallic zinc, 0.1 g of metallic indium and 0.05 g of metallic bismuth, to fabricate a battery "K9". The indium and bismuth contents of the zinc alloy powder, when reduced to element, were 0.1 mass % and 0.05 mass %, respectively, based on the total weight of zinc, indium and bismuth.

Experiment 7-10

The procedure of Experiment #1 was followed, except that the zinc alloy powder, for use in the fabrication of a negative electrode, was prepared from metallic zinc and metallic indium mixed in the ratios indicated in Table 9, to fabricate batteries "K10" through "K16" with different indium contents. Table 9 also shows the composition of the zinc alloy powder used in the fabrication of the battery "K1".

TABLE 9

| Designation of Battery | Amount of Metallic Zinc(g) | Amount of Metallic Indium (g) | Indium Content (mass %) |
|---|---|---|---|
| K10 | 99.997 | 0.003 | 0.003 |
| K11 | 99.995 | 0.005 | 0.005 |
| K12 | 99.99 | 0.01 | 0.01 |
| K13 | 99.95 | 0.05 | 0.05 |
| K1 | 99.9 | 0.1 | 0.1 |
| K14 | 99.8 | 0.2 | 0.2 |
| K15 | 99.5 | 0.5 | 0.5 |
| K16 | 99.4 | 0.6 | 0.6 |

Comparative Experiment 7-1

The procedure of Experiment #1 was followed, except that the zinc alloy powder, for use in the fabrication of a negative electrode, was replaced by zinc powder prepared solely from metallic zinc, to fabricate a comparative battery "L".

In the same manner as in Experiment #1, the batteries "K1" through "K16", as well as the comparative battery "L", were subjected, after the high-temperature storage, to charge-discharge cycle test for measurement of 1st-cycle and 10th-cycle discharge capacity. The number of sample batteries showed leakage was also counted after the 1st cycle, 5th cycle and 10th cycle for each of those batteries.

The results are given in Tables 10 and 11. In these Tables, either of the 1st-cycle discharge capacity and 10th-cycle discharge capacity for each battery is indicated by a mean value obtained by averaging the discharge capacity values measured for the sample batteries which showed no leakage of electrolyte, and by an index number as its discharge capacity value measured before the high-temperature storage is taken as a standard value of 100. A proportion of sample batteries which showed leakage of the electrolyte, after the 1st, 5th or 10th cycle, is also shown for each battery. The number of sample batteries subjected to the charge-discharge cycle test is given in a denominator, while the number of sample batteries showed leakage of the electrolyte is given in a numerator.

TABLE 10

| Designation of Battery | Type of Additive | Amount of Additive (mass %) | 1st-cycle Disc. Cap. | 10th-cycle Disc. Cap. | Number of cycles | Degree of Leakage (*1) |
|---|---|---|---|---|---|---|
| K1 | In | 0.1 | 100 | 100 | 1 | 0/10 |
| | | | | | 5 | 0/10 |
| | | | | | 10 | 3/10 |
| K2 | Bi | 0.1 | 100 | 100 | 1 | 0/10 |
| | | | | | 5 | 0/10 |
| | | | | | 10 | 0/10 |
| K3 | Sn | 0.1 | 100 | 99 | 1 | 0/10 |
| | | | | | 5 | 0/10 |
| | | | | | 10 | 0/10 |
| K4 | Ga | 0.1 | 99 | 99 | 1 | 0/10 |
| | | | | | 5 | 0/10 |
| | | | | | 10 | 0/10 |
| K5 | $In_2O_3$ | 0.1 | 100 | 99 | 1 | 0/10 |
| | | | | | 5 | 0/10 |
| | | | | | 10 | 0/10 |
| K6 | $Bi_2O_3$ | 0.1 | 100 | 99 | 1 | 9/10 |
| | | | | | 5 | 0/10 |
| | | | | | 10 | 0/10 |
| K7 | SnO | 0.1 | 99 | 98 | 1 | 0/10 |
| | | | | | 5 | 0/10 |
| | | | | | 10 | 0/10 |
| K8 | $Ga_2O_3$ | 0.1 | 100 | 99 | 1 | 0/10 |
| | | | | | 5 | 0/10 |
| | | | | | 10 | 0/10 |
| K9 | In, Sn | 0.1(In) | 100 | 100 | 1 | 0/10 |
| | | 0.05 (Sn) | | | 5 | 0/10 |
| | | | | | 10 | 0/10 |
| K10 | In | 0.003 | 99 | 99 | 1 | 3/10 |
| | | | | | 5 | 5/10 |
| | | | | | 10 | 6/10 |

(*1)A proportion of sample batteries showed leakage of the electrolyte.

TABLE 11

| Designation of Battery | Type of Additive | Amount of Additive (mass %) | 1st-cycle Disc. Cap. | 10th-cycle Disc. Cap. | Number of cycles | Degree of Leakage (*1) |
|---|---|---|---|---|---|---|
| K11 | In | 0.005 | 100 | 99 | 1 | 0/10 |
|  |  |  |  |  | 5 | 0/10 |
|  |  |  |  |  | 10 | 0/10 |
| K12 | In | 0.01 | 100 | 100 | 1 | 0/10 |
|  |  |  |  |  | 5 | 0/10 |
|  |  |  |  |  | 10 | 0/10 |
| K13 | In | 0.05 | 100 | 100 | 1 | 0/10 |
|  |  |  |  |  | 5 | 0/10 |
|  |  |  |  |  | 10 | 0/10 |
| K14 | In | 0.2 | 99 | 99 | 1 | 0/10 |
|  |  |  |  |  | 5 | 0/10 |
|  |  |  |  |  | 10 | 0/10 |
| K15 | In | 0.5 | 98 | 97 | 1 | 0/10 |
|  |  |  |  |  | 5 | 0/10 |
|  |  |  |  |  | 10 | 0/10 |
| K16 | In | 0.6 | 98 | 90 | 1 | 0/10 |
|  |  |  |  |  | 5 | 0/10 |
|  |  |  |  |  | 10 | 0/10 |
| L | — | — | 98 | — | 1 | 9/10 |
|  |  |  |  |  | 5 | 9/10 |
|  |  |  |  |  | 10 | 10/10 |

(*1)A proportion of sample batteries showed leakage of the electrolyte.

As will be understood from the results shown in Tables for the batteries "K1" through "K16" and the comparative battery "L", the addition of any one of the above-specified elements, either in its metallic or oxide form, in the fabrication of the negative electrode, results in the provision of excellent batteries which show no leakage of the electrolyte even after the high-temperature storage and which exhibit a low degree of deterioration in discharge capacity even after repetitive charge-discharge cycles. It has been also recognized that the similar effects are obtained with the addition of two or more of the above-specified elements.

The leakage of electrolyte was observed at a high degree of occurrence for the comparative battery "L". This is considered due to the absence of additive element in its negative electrode which results in the self-discharge of zinc, during storage, accompanied by the hydrogen gas evolution acting to increase an internal pressure finally to a level sufficient to cause leakage of the electrolyte.

As can be seen from the results shown in Tables 10 and 11, the batteries "K1" and "K11" through "K15", whose negative electrodes have the additive contents in the range of 0.005–0.5 mass %, show no leakage of electrolyte even after the high-temperature storage, as well as exhibit a low degree of deterioration in discharge capacity even after charge-discharge cycles. Due to the insufficiency in amount of the additive to suppress self-discharge of zinc, the charge-discharge cycling of the battery "K10" resulted in the increased occurrence of leakage of electrolyte. Due probably to the excessive loading of the additive which resulted in the reduced amount of zinc in the negative electrode, the discharge capacity of the battery "K16" was decreased with increasing charge-discharge cycles.

The results demonstrate that the preferred amount of additive to be incorporated ranges from 0.005 mass % to 0.5 mass %, relative to the metallic zinc.

It has been confirmed that the similar results can be obtained with the use of the other types of additives.

In the above Experiments, the potassium hydroxide (KOH) solution was utilized for the electrolyte. The electrolyte may contain lithium hydroxide (LiOH) or sodium hydroxide (NaOH). Even in such a case, its water content is controlled preferably within the range of 0.5 g–0.9 g for each theoretical capacity of the negative electrode. The superb effect of the present invention can be expected, provided the total alkaline concentration is kept within the range of 30–45 mass %.

What is claimed is:

1. A sealed alkaline-zinc storage battery comprising:
   a battery can;
   a hollow positive electrode disposed within said battery can in electrical contact therewith and containing a positive active material comprising nickel hydroxide;
   a negative electrode disposed inwardly of said positive electrode and containing a negative active material comprising zinc;
   a separator disposed between said positive electrode and said negative electrode;
   a negative current collector disposed inserted into said negative electrode; and
   an alkaline electrolyte filled in said battery can and impregnated into said positive electrode, said negative electrode and said separator;
   wherein said positive electrode, said negative electrode, said separator, said negative current collector and said electrolyte together account for at least 75% of an internal volume of said battery can; and
   wherein said alkaline electrolyte has a concentration in the range of 30 to 45 mass % and has a total water content in the range of 0.5 to 0.9 g for each theoretical capacity expressed as 1 Ah of said negative electrode.

2. The sealed alkaline-zinc storage battery of claim 1, wherein said alkaline electrolyte is comprised principally of a potassium hydroxide aqueous solution.

3. The sealed alkaline-zinc storage battery of claim 1, wherein said negative active material comprising zinc comprises a zinc active material prepared principally from a mixture of metallic zinc and zinc oxide, and wherein said zinc oxide is contained in said zinc active material in the amount of 5 to 40 mass % relative to a mass of said metallic zinc.

4. The sealed alkaline-zinc storage battery of claim 1, wherein said negative electrode is a gelled negative electrode containing said negative active material.

5. The sealed alkaline-zinc storage battery of claim 4, wherein said gelled negative electrode comprises said negative active material, a gelling agent and said alkaline electrolyte.

6. The sealed alkaline-zinc storage battery of claim 1, wherein said nickel hydroxide is present in the form of γ-nickel oxyhydroxide.

7. The sealed alkaline-zinc storage battery of claim 6, wherein said γ-nickel oxyhydroxide has a valence number within the range of 3.4 to 3.8.

8. The sealed alkaline-zinc storage battery of claim 1, wherein said positive active material further comprises at least one element selected from the group consisting of manganese (Mn), aluminum (Al), cobalt (Co), yttrium (Y), ytterbium (Yb), erbium (Er) and gadolinium (Gd), which is added to said nickel hydroxide to form a solid solution therewith.

9. The sealed alkaline-zinc storage battery of claim 8, wherein said at least one element is added in the amount of 5 to 50 mass %, based on a total amount of said positive active material.

10. The sealed alkaline-zinc storage battery of claim 1, wherein said negative active material further comprises an additive to increase a hydrogen overvoltage of said negative active material.

11. The sealed alkaline-zinc storage battery of claim 10, wherein said additive comprises at least one additive selected from the group consisting of indium (In), bismuth (Bi), tin (Sn), gallium (Ga), indium oxide ($In_2O_3$), bismuth oxide ($Bi_2O_3$), tin oxide (SnO) and gallium oxide ($Ga_2O_3$).

12. The sealed alkaline-zinc storage battery of claim 11, wherein said zinc comprises metallic zinc, and said additive is contained in the amount of 0.005 to 0.5 mass %, relative to a mass of said metallic zinc.

13. The sealed alkaline-zinc storage battery of claim 1, wherein said alkaline electrolyte contains at least one of potassium hydroxide, sodium hydroxide and lithium hydroxide.

* * * * *

UNITED STATES PATENT AND TRADEMARK OFFICE
CERTIFICATE OF CORRECTION

PATENT NO. : 6,265,105 B1
DATED : July 24, 2001
INVENTOR(S) : Tokuda et al.

It is certified that error appears in the above-identified patent and that said Letters Patent is hereby corrected as shown below:

Column 11,
Line 67, after "0.009", replace "mole/i" by -- mole/l --.

Signed and Sealed this

Eighth Day of April, 2003

JAMES E. ROGAN
*Director of the United States Patent and Trademark Office*